United States Patent
Zaremski et al.

(10) Patent No.: US 8,751,946 B2
(45) Date of Patent: Jun. 10, 2014

(54) ENHANCED DISPLAY OF PROPERTIES FOR A PROGRAM OBJECT

(75) Inventors: Miroslaw W. Zaremski, Richmond Hill (CA); Hesham E. Fahmy, Etobicoke (CA); John H. Green, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1665 days.

(21) Appl. No.: 11/398,057

(22) Filed: Apr. 5, 2006

(65) Prior Publication Data

US 2007/0245252 A1    Oct. 18, 2007

(51) Int. Cl.
*G06F 3/00* (2006.01)

(52) U.S. Cl.
USPC .............. 715/762; 715/744; 717/109

(58) Field of Classification Search
USPC .................. 715/744, 762; 717/109
See application file for complete search history.

(56) References Cited

U.S. PATENT DOCUMENTS

| | | |
|---|---|---|
| 5,228,123 A | 7/1993 | Heckel |
| 5,467,472 A | 11/1995 | Williams et al. |
| 5,507,030 A | 4/1996 | Sites |
| 5,625,823 A | 4/1997 | Debenedictis et al. |
| 5,642,511 A | 6/1997 | Chow et al. |
| 5,642,513 A | 6/1997 | Schnellinger et al. |
| 5,786,815 A * | 7/1998 | Ford .............................. 715/744 |
| 5,822,520 A | 10/1998 | Parker |
| 5,825,877 A | 10/1998 | Dan et al. |
| 5,870,088 A | 2/1999 | Washington et al. |
| 5,872,974 A | 2/1999 | Mezick |
| 5,897,642 A | 4/1999 | Capossela et al. |
| 5,929,851 A | 7/1999 | Donnelly |
| 5,950,001 A | 9/1999 | Hamilton et al. |
| 5,991,534 A | 11/1999 | Hamilton et al. |
| 6,006,242 A | 12/1999 | Poole et al. |
| 6,044,217 A | 3/2000 | Brealey et al. |
| 6,049,805 A | 4/2000 | Drucker et al. |
| 6,059,838 A | 5/2000 | Fraley et al. |
| 6,100,885 A | 8/2000 | Donnelly et al. |
| 6,208,336 B1 * | 3/2001 | Carter ........................... 715/866 |
| 6,237,135 B1 | 5/2001 | Timbol |
| 6,286,134 B1 | 9/2001 | Click, Jr. et al. |
| 6,523,170 B1 | 2/2003 | Cuomo et al. |

(Continued)

FOREIGN PATENT DOCUMENTS

WO    9960478    11/1999

OTHER PUBLICATIONS

MicroSoft Windows XP Explorer (Screen dumps, 2001; pp. 3).*

(Continued)

*Primary Examiner* — Linh K Pham
(74) *Attorney, Agent, or Firm* — Jeff Tang; Hoffman Warnick LLC

(57) ABSTRACT

A solution for managing a program object that generates an enhanced user interface for displaying properties of the program object is provided. A set of properties for the program object are obtained from the program object and/or deployment data for the program object. A property object that corresponds to the program object is also obtained. The property object defines a set of user interface attributes for the program object. The user interface then is generated based on the set of properties and the property object. As a result, a user interface that includes one or more features that makes it more user-friendly for a user can be generated.

17 Claims, 5 Drawing Sheets

(56) References Cited

U.S. PATENT DOCUMENTS

| | | | |
|---|---|---|---|
| 6,609,123 B1 | 8/2003 | Cazemier et al. | |
| 6,609,128 B1 | 8/2003 | Underwood | |
| 6,629,002 B1 | 9/2003 | Holder | |
| 6,697,967 B1 | 2/2004 | Robertson | |
| 6,721,777 B1 | 4/2004 | Sharma | |
| 6,784,883 B1 | 8/2004 | Allor | |
| 6,807,632 B1 | 10/2004 | Carpentier et al. | |
| 6,816,882 B1 | 11/2004 | Conner et al. | |
| 6,928,640 B2 | 8/2005 | Schlussman | |
| 6,941,515 B1 | 9/2005 | Wilkins | |
| 6,961,932 B2 | 11/2005 | Mishra et al. | |
| 7,003,560 B1 | 2/2006 | Mullen et al. | |
| 7,127,641 B1 | 10/2006 | Anderson | |
| 7,152,090 B2 | 12/2006 | Amirisetty et al. | |
| 7,216,299 B2 * | 5/2007 | Knight | 715/764 |
| 7,278,136 B2 | 10/2007 | Moritz et al. | |
| 7,376,939 B1 | 5/2008 | Nayak et al. | |
| 7,421,686 B2 | 9/2008 | Souloglou et al. | |
| 7,434,211 B2 | 10/2008 | Wynn et al. | |
| 7,454,492 B2 * | 11/2008 | Bauer et al. | 709/223 |
| 7,467,375 B2 | 12/2008 | Tondreau et al. | |
| 7,519,956 B2 | 4/2009 | Fukuda et al. | |
| 7,533,246 B2 | 5/2009 | Taylor | |
| 7,581,212 B2 | 8/2009 | West et al. | |
| 2002/0035488 A1 | 3/2002 | Aquila et al. | |
| 2002/0184401 A1 | 12/2002 | Kadel et al. | |
| 2003/0069969 A1 | 4/2003 | Renaud | |
| 2003/0084425 A1 | 5/2003 | Glaser | |
| 2003/0112275 A1 | 6/2003 | Proulx et al. | |
| 2004/0078495 A1 | 4/2004 | Mousseau et al. | |
| 2004/0133627 A1 | 7/2004 | Kalyanaraman et al. | |
| 2004/0162724 A1 | 8/2004 | Hill et al. | |
| 2004/0215655 A1 | 10/2004 | Rangadass | |
| 2005/0044110 A1 | 2/2005 | Herzenberg et al. | |
| 2005/0114834 A1 | 5/2005 | Richards et al. | |
| 2005/0138646 A1 | 6/2005 | Mese et al. | |
| 2006/0195413 A1 | 8/2006 | Davis et al. | |
| 2006/0195777 A1 | 8/2006 | Davis et al. | |
| 2006/0236254 A1 | 10/2006 | Mateescu et al. | |
| 2007/0038610 A1 | 2/2007 | Omoigui | |
| 2007/0050366 A1 | 3/2007 | Bugir et al. | |
| 2007/0050419 A1 | 3/2007 | Weyl et al. | |
| 2007/0150387 A1 | 6/2007 | Seubert et al. | |

OTHER PUBLICATIONS

Chamberland et al.; IBM VisualAge for Java; © 1998; IBM; 23 pages.*

Baker, S., "The Making of Orbix and the Portal Suite," ICSE2000, Limerick, Ireland, pp. 609-616.

Chiang, C., "Development of Reusable Components through the Use of Adapters," Proceedings of the 36th Hawaii International Conference on System Sciences, 2003, pp. 1-10.

Lunt, P., "Join the Pieces to Build Processes," Jun. 2003, http://www.transformmag.com/db_area/archs/2003/06/tfm0306tr_1.shtml, pp. 1-4.

U.S. Appl. No. 11/399,232, Notice of Allowance and Fees Due, filed Dec. 28, 2009, 7 pages.

U.S. Appl. No. 11/399,232, Office Action, filed Jul. 23, 2009, 15 pages.

Psaila, "Virtual DOM: an Efficient Virtual Memory Representation for Large XML Documents", 19th International Conference on Database and Expert Systems Application, 2008, IEEE, pp. 233-237.

Al-Ekram et al., "An XML-based Framework for Language Neutral Program Representation and Generic Analysis", Proceedings of the 28th Annual International Computer Software and Applications Conference (COMPSAC '04), 2004 IEEE, 2 pgs.

Van Engelen, "Code Generation Techniques for Developing Light-Weight XML Web Services for Embedded Devices", 2004 ACM Symposium on Applied Computing, Mar. 14-17, 2004, pp. 854-861.

Corwin et al., "MJ: A Rational Module System for Java and its Applications", OOPSLA '03, Oct. 26-30, 2003, pp. 241-254.

Hentrich et al., "Patterns for Business Object Model Integration in Process-Driven and Service-Oriented Architectures", PLoP '06, Oct. 21-23, 2006, 14 pgs.

U.S. Appl. No. 10/907,363, Office Action, filed Jun. 1, 2007, 21 pages.

U.S. Appl. No. 10/907,363, Office Action, filed Oct. 30, 2007, 25 pages.

U.S. Appl. No. 10/907,363, Office Action, Apr. 7, 2008 19 pages.

U.S. Appl. No. 10/907,363, Office Action, filed Sep. 30, 2008, 17 pages.

U.S. Appl. No. 10/907,363, Office Action, filed Mar. 3, 2009 16 pages.

U.S. Appl. No. 10/907,363, Examiner's Answer, filed Aug. 28, 2011, 12 pages.

Bernstein et al., "The Microsoft Repository", Proceedings of the 23rd VLDB Conference, Atens, Greece, 1997, 10 pgs.

Mueller et al., Penumbra: an Eclipse plugin for introductory programming. In Proceedings of the 2003 OOPSLA Workshop on Eclipse Technology Exchange (Anaheim. California, Oct. 27, 2003, 65-68.

Berliner, CVS II: Parelleizing Software Development, White paper, Prisma, Inc., Colorado Springs, CO, 1990.

U.S. Appl. No. 10/907,423, Office Action, filed Mar. 26, 2009, 18 pgs.

U.S. Appl. No. 10/907,423, Office Action, filed Oct. 30, 2009, 13 pgs.

U.S. Appl. No. 10/907,423, Office Action, filed Jul. 7, 2010, 9 pgs.

U.S. Appl. No. 10/907,423, Office Action, filed Feb. 28, 2011, 12 pgs.

Dulman, L. "Visual Ada developer", 2002, ACM pp. 30-34.

Green, T. "Verdantium Towards A Java-Enabled Compound Document Model", 2000, ACM, pp. 77-78.

U.S. Appl. No. 11/398,875, Office Action, filed Mar. 17, 2008, 31 pages.

U.S. Appl. No. 11/398,875, Office Action, filed Oct. 21, 2008, 13 pages.

U.S. Appl. No. 11/398,875, Office Action, filed Apr. 2, 2009, 19 pages.

U.S. Appl. No. 11/398,875, Office Action, filed Nov. 25, 2009, 19 pages.

U.S. Appl. No. 11/398,875, Examiner's Answer, filed Jul. 12, 2010, 22 pages.

U.S. Appl. No. 11/398,875, Notice of Allowance and Fees Due, filed Dec. 16, 2013, 11 pages.

* cited by examiner

FIG. 4B

Connection class name: com.ibm.connector2.cics.ECIManagedConnectionFactory

Server Settings
Connection URL:*
Server name:
Port number:
User Verification
User name:
Password:
[Hide Advanced <<]

Trace level: 1
Security
Client security:
Server security:
Key ring class:
Key ring password:

TPN name:
Tran name:

42B

ENHANCED DISPLAY OF PROPERTIES FOR A PROGRAM OBJECT

REFERENCE TO RELATED APPLICATION

The current application is related to the co-owned and co-pending U.S. patent application Ser. No. 10/907,423 filed on Mar. 31, 2005, and entitled "Generic User Input for GUI Framework", which is hereby incorporated herein by reference.

FIELD OF THE INVENTION

The invention relates generally to managing a set of program objects, and more particularly, to a solution for enhancing a user interface for displaying a set of properties for a program object.

BACKGROUND OF THE INVENTION

Frequently, program objects, such as Java™ Beans defined by Sun Microsystems, Inc., include a set of configurable properties (Java and all Java-based trademarks are trademarks of Sun Microsystems, Inc. in the United States, other countries, or both). To this extent, it is desirable to generate a user interface to enable a user to specify one or more of the configurable properties of a Java Bean. In order to generate the user interface, the configurable properties can be introspected from the Java Bean. Further, the configurable properties can be read from a file that includes information about the Java Bean.

For example, the Java 2 Platform, Enterprise Edition (J2EE) defines a J2EE Connector Architecture (CA) that includes a Resource Adapter. A J2EE CA Resource Adapter exposes an object to administration and development tools by specifying various information in a resource adapter deployment descriptor file (ra.xml). This file includes information on each configurable property, which is specified as name/type/value tuples. In this case, an administration and development tool can use the ra.xml file and/or the object to discover the corresponding configurable properties. These configurable properties are then included in a generic user interface that is presented to a user.

In view of the foregoing, there exists a need in the art to overcome one or more of the deficiencies indicated herein and/or one or more other deficiencies not expressly discussed herein.

BRIEF SUMMARY OF THE INVENTION

The invention provides a solution for managing a program object that generates an enhanced user interface for displaying properties of the program object. A set of properties for the program object are obtained from the program object and/or deployment data for the program object. A property object that corresponds to the program object is also obtained. The property object defines a set of user interface attributes for the program object. The user interface then is generated based on the set of properties and the property object. As a result, a user interface that includes one or more features that makes it more user-friendly for a user can be generated. The program object can comprise, for example, a Java Bean. In one embodiment, the program object comprises a Java Bean that is implemented as part of a J2EE CA Resource Adapter, and the deployment data is stored in a deployment description file for the Resource Adapter, ra.xml.

A first aspect of the invention provides a method of managing a program object, the method comprising: obtaining a set of properties for the program object; obtaining a property object for the program object, the property object defining a set of user interface attributes for the program object; and generating a user interface based on the set of properties and the property object.

A second aspect of the invention provides a system for managing a program object, the system comprising: a system for obtaining a set of properties for the program object; a system for obtaining a property object for the program object, the property object defining a set of user interface attributes for the program object; and a system for generating a user interface based on the set of properties and the property object.

A third aspect of the invention provides a program product stored on a computer-readable medium, which when executed, enables a computer infrastructure to manage a program object, the program product comprising computer program code for enabling the computer infrastructure to: obtain a set of properties for the program object; obtain a property object for the program object, the property object defining a set of user interface attributes for the program object; and generate a user interface based on the set of properties and the property object.

A fourth aspect of the invention provides a method of generating a system for managing a program object, the method comprising: providing a computer infrastructure operable to: obtain a set of properties for the program object; obtain a property object for the program object, the property object defining a set of user interface attributes for the program object; and generate a user interface based on the set of properties and the property object.

A fifth aspect of the invention provides a method for managing a set of program objects, the method comprising managing a computer infrastructure that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 4B shows an alternative user interface that can be displayed after the user interface of FIG. 4A has been expanded by a user according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing a program object that generates an enhanced user interface for displaying properties of the program object. A set of properties for the program object are obtained from the program object and/or deployment data for the program object. A property object that corresponds to the program object is also obtained. The property object defines a set of user interface attributes for the program object. The user interface then is generated based on the set of properties and the property object. As a result, a user interface that includes one or more features that makes it more user-friendly for a user can be generated. The program object can comprise, for example, a Java Bean. In one embodiment, the program object comprises a Java Bean that is implemented as part of a J2EE CA Resource Adapter, and the deployment data is stored in a deployment description file for the Resource Adapter, ra.xml. As used herein, unless otherwise noted, the term "set" means one or more (i.e., at least one) and the phrase "any solution" means any now known or later developed solution.

Figure 1:
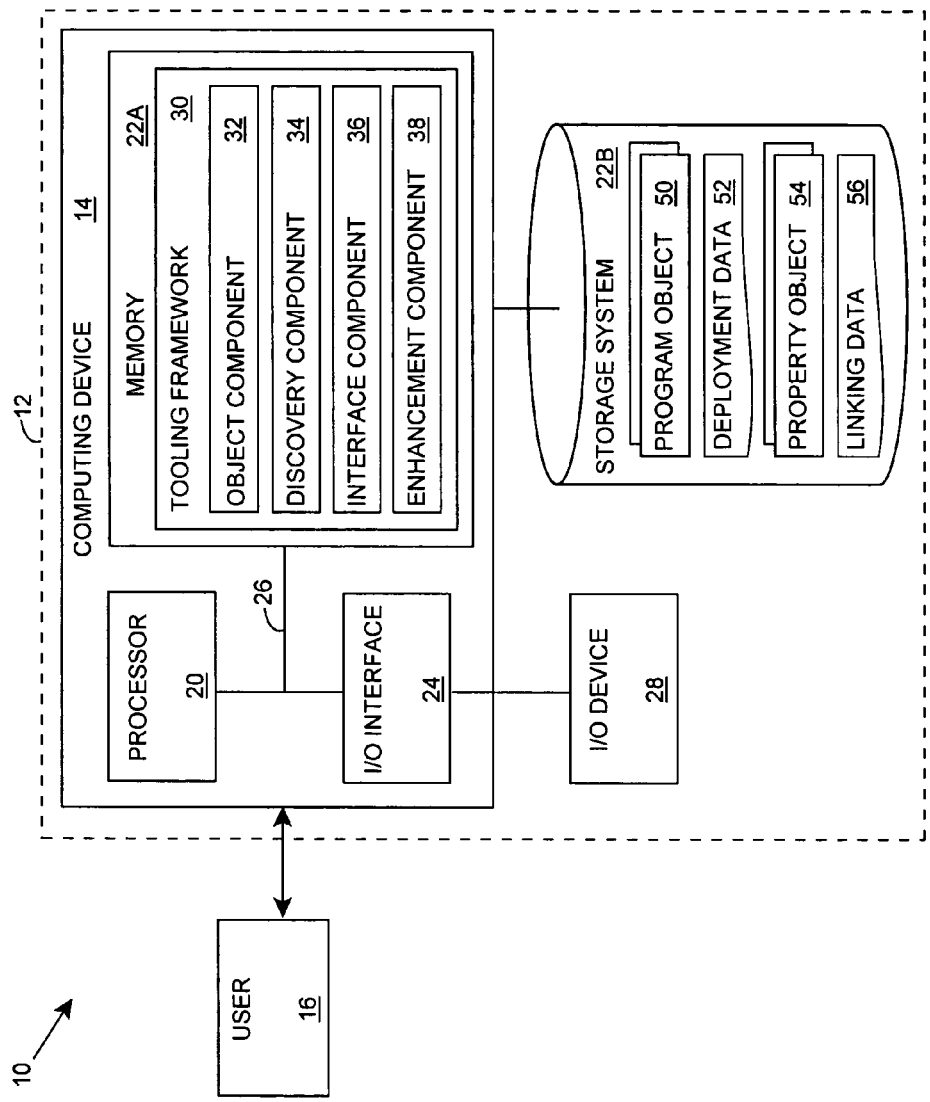
FIG. 1 shows an illustrative environment for managing a set of program objects according to an embodiment of the invention.

Turning to the drawings, FIG. 1 shows an illustrative environment 10 for managing a set of program objects 50 according to an embodiment of the invention. To this extent, environment 10 includes a computer infrastructure 12 that can perform the process described herein in order to manage program object(s) 50. In particular, computer infrastructure 12 is shown including a computing device 14 that comprises a tooling framework 30, which makes computing device 14 operable to manage program object(s) 50 by performing the process described herein. To this extent, tooling framework 30 enables computer infrastructure 12 to generate an improved user interface for displaying one or more properties of a program object 50 and their corresponding value(s) and/or enabling user 16 to select a value for one or more of the properties.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as tooling framework 30, which is stored in memory 22A and/or storage system 22B. While executing computer program code, processor 20 can read and/or write data, such as program object 50, to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link.

In any event, computing device 14 can comprise any general purpose computing article of manufacture capable of executing computer program code installed thereon (e.g., a personal computer, server, handheld device, etc.). However, it is understood that computing device 14 and tooling framework 30 are only representative of various possible equivalent computing devices that may perform the process described herein. To this extent, in other embodiments, the functionality provided by computing device 14 and tooling framework 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices (e.g., a server cluster) that communicate over any type of communications link, such as a network, a shared memory, or the like, to perform the process described herein. Further, while performing the process described herein, one or more computing devices in computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, tooling framework 30 enables computer infrastructure 12 to manage a set of program objects 50. To this extent, tooling framework 30 is shown including an object component 32, a discovery component 34, an interface component 36, and an enhancement component 38. Operation of each of these components is discussed further herein. However, it is understood that some of the various systems/components shown in FIG. 1 can be implemented independently, combined, and/or stored in memory for one or more separate computing devices that are included in computer infrastructure 12. Further, it is understood that some of the systems/components and/or functionality may not be implemented, or additional systems/components and/or functionality may be included as part of computer infrastructure 12.

Regardless, the invention provides a solution for managing a set of program objects, in which an improved user interface for displaying one or more properties of a program object 50 and their corresponding value(s) and/or enabling user 16 to select a value for one or more of the properties is generated. In general, object component 32 can manage a set of program objects 50 and corresponding deployment data 52. Each program object 50 can comprise any type of program object. For example, program object 50 can comprise a Java Bean, an applet (e.g., a Java applet), an object file, an executable, and/or the like.

Optionally, object component 32 also can manage deployment data 52 for the set of program objects 50. Deployment data 52 can include various information about the set of program objects 50. For example, deployment data 52 can comprise information about an interface, such as an application program interface (API), for one or more program object(s) 50, an implementing Java class for the interface, and/or the like. Further, deployment data 52 can include information about one or more configurable properties for program object(s) 50, e.g., specified in a name/type/value tuple. Deployment data 52 can be stored and accessed using any solution. For example, deployment data 52 can comprise one or more records in a database, one or more files, each of which comprises data stored in any data storage format, and/or the like. In one embodiment, deployment data 52 comprises a file that includes data stored using an extensible markup language (XML) file format.

Discovery component 34 obtains a set of properties and/or their corresponding values for a particular program object 50. To this extent, discovery component 34 can analyze deployment data 52 and/or program object 50 using any solution. In the latter case, when program object 50 comprises a Java Bean, discovery component 34 can introspect program object 50 by using an Introspector class as defined by the Java Bean specification, which can obtain explicit and implicit information on program object 50. Further, when program object 50 is implemented as part of a J2EE CA Resource Adapter, discovery component 34 can obtain deployment data 52 that is stored in a deployment description file (e.g., ra.xml).

Figure 2:
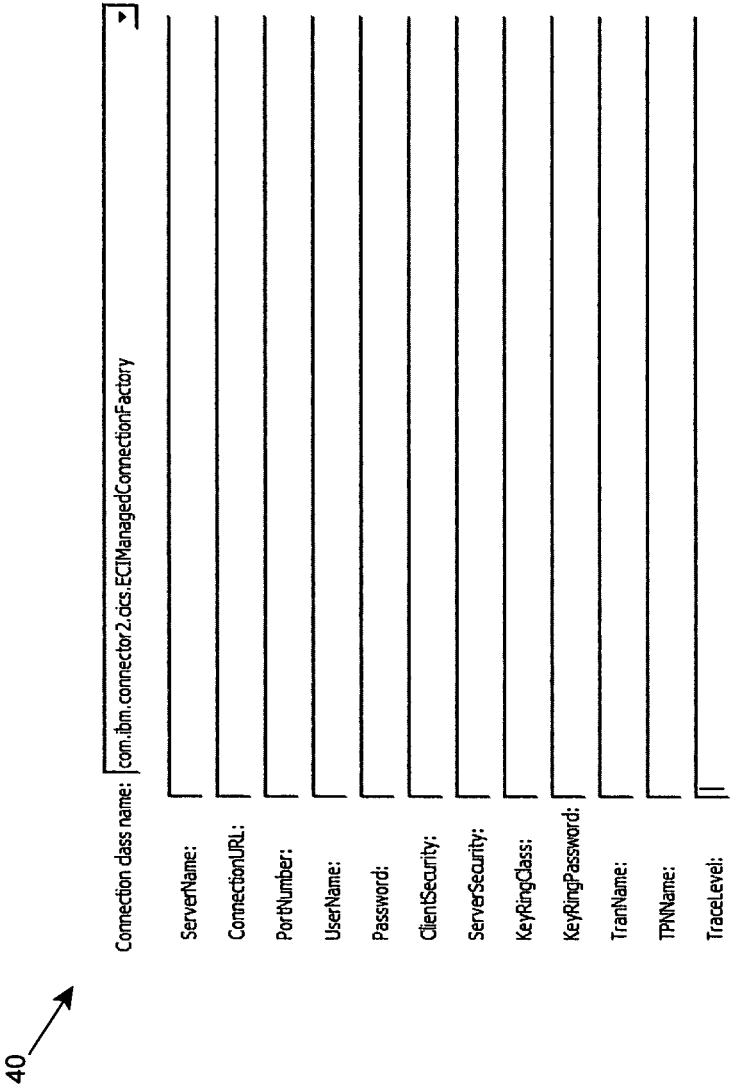
FIG. 2 shows a prior art user interface.

Interface component 36 generates a user interface for the set of properties for program object 50. For example, FIG. 2 shows a prior art user interface 40. Interface 40 includes a name of each property and a corresponding user interface control (i.e., a text box) that enables user 16 (FIG. 1) to provide a value for the property. However, interface 40 lacks several features that are commonly incorporated into user interfaces. For example, the properties are not grouped/ordered according to relationships, some of the property names are not user-friendly, there are no default values, there is no indication of what properties are required/optional, etc.

Returning to FIG. 1, enhancement component 38 enables interface component 36 to generate a user interface that includes one or more enhancements to improve the usability of the resulting user interface for user 16. To this extent, enhancement component 38 can manage a set of property objects 54. Each property object 54 includes various data that can be used by interface component 36 in generating a user interface, and can be implemented using any solution. In one embodiment, property object 54 comprises a PropertyGroup Java object as shown and described in the co-owned and co-pending U.S. patent application Ser. No. 10/907,423 filed on Mar. 31, 2005, which is hereby incorporated herein by reference. In this case, property object 54 includes various information for enhancing the user interface. Regardless, each property object 54 can correspond to a unique program object 50. To this extent, enhancement component 38 can further manage linking data 56, which links a program object 50 with a corresponding property object 54 and/or vice versa. Linking data 56 can be stored and accessed using any solution. In one embodiment, linking data 56 can be stored and accessed in a static configuration table for tooling framework 30.

In general, enhancement component 38 enables one or more users 16 to view, modify, delete, and/or the like, one or more program objects 50 and/or linking data 56 using any solution. To this extent, enhancement component 38 can generate a user interface for display to user 16, which renders some or all of a program object 50 and/or linking data 56. In this case, the user interface can enable user 16 to request any function (e.g., modify, delete, and/or the like) to be implemented on the displayed data. Further, enhancement component 38 can define an application program interface (API) or the like that enables user 16, another system in this case, to request any function to be implemented on a program object 50 and/or linking data 56.

Figure 3:
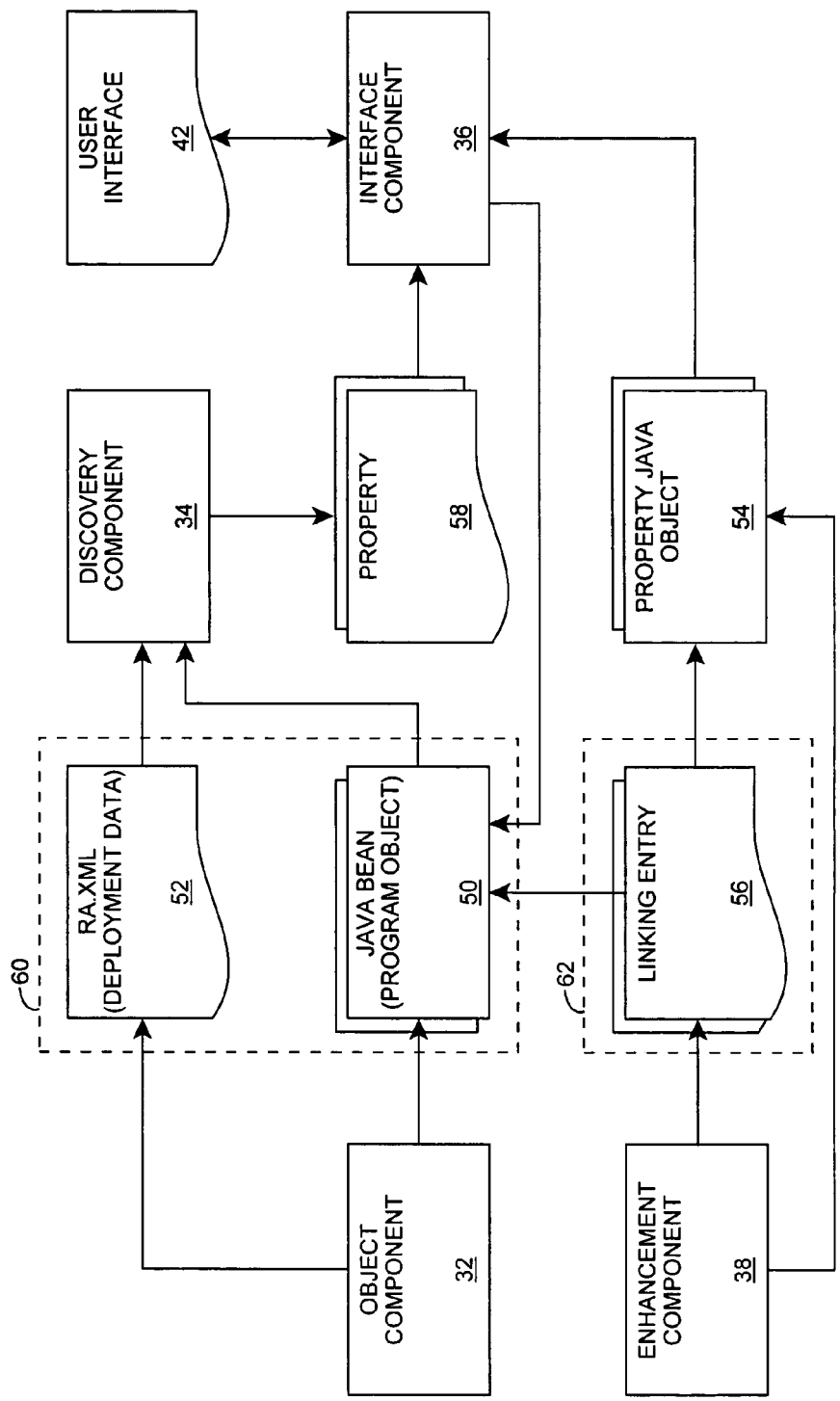
FIG. 3 shows an illustrative data flow diagram for generating a user interface according to an embodiment of the invention.

In any event, FIG. 3 shows an illustrative data flow diagram for generating a user interface 42 according to an embodiment of the invention. In this case, tooling framework 30 (FIG. 1) comprises an administration and/or development tool (e.g., an Integrated Development Environment), and each program object 50 comprises a Java Bean 50 that is implemented as part of a J2EE CA Resource Adapter. To this extent, the Resource Adapter includes a deployment description file, ra.xml 52, which is stored together with the set of Java Beans 50 in a Resource Adapter Archive (RAR) 60.

As discussed herein, object component 32 manages the set of Java Beans 50 and ra.xml 52. Further, enhancement component 38 manages a set of property Java objects 54 and corresponding set of linking entries 56. Each linking entry 56 comprises linking data for linking a property Java object 54 with a corresponding Java Bean 50 and/or vice versa. To this extent, each linking entry 56 is shown stored in a static configuration table 62 for tooling framework 30 (FIG. 1). In order to generate a user interface 42 for displaying properties of a Java Bean 50, discovery component 34 can obtain a set of properties 58 for the Java Bean 50. To this extent, discovery component 34 can obtain one or more properties and/or their corresponding values from the deployment description file, ra.xml 52 and/or by analyzing Java Bean 50, e.g., using the Introspector class.

Interface component 36 can generate user interface 42 based on the set of properties 58 and the property Java object 54 that corresponds to Java Bean 50. Interface component 36 can obtain property Java object 54 by obtaining a linking entry 56 in configuration table 62 that corresponds to Java Bean 50 and identifying the corresponding property Java object 54 based on linking entry 56. To this extent, linking entry 56 can uniquely identify both Java Bean 50 and property Java object 54 (e.g., based on the corresponding implementing Java class for each object), thereby defining a mapping between the two objects.

In order to match a property 58 with a corresponding entry in property Java object 54, property Java object 54 can include sufficient data to map each entry with its corresponding property 58. For example, each entry in property Java object 54 can include annotation data that includes the name of the corresponding property 58 (e.g., a "property name" attribute) and/or any additional information that may be needed to correctly map the entry to the correct property 58. It is understood that while each entry in property Java object 54 will have a corresponding unique property 58 from Java Bean 50, each property 58 will not necessarily have a corresponding entry in property Java object 54.

In any event, property Java object 54 can define a set of user interface attributes for Java Bean 50, one or more of which interface component 36 can use to generate user interface 42. For example, property Java object 54 can define a display name for one or more properties 58. The display name can comprise a name that is more meaningful and/or more user-friendly for a user 16 to view, read, and/or understand. Additionally, property Java object 54 can define a property group that includes a set of related properties 58 and can have a property group name. This enables interface component 36 to group the properties 58 in user interface 42. For example, interface component 36 can display the properties 58 of each property group in an area that is visually separated from other properties/property groups by a line, a box, a header (e.g., the property group name) and/or the like. Similarly, property Java object 54 can define a relative priority of each property 58 and/or property group. In this case, interface component 36 can render each property 58 and/or property group in an order from, for example, a highest priority to a lowest priority for user 16 (FIG. 1).

To further illustrate these concepts, the following illustrative example of a property Java object 54 is included:
package property.mapping.example;
import java.util.logging.Level;
import java.util.logging.Logger;
import com.ibm.propertygroup.api.IPropertyDescriptor;
import com.ibm.propertygroup.spi.BasePropertyGroup;
import com.ibm.propertygroup.spi.BaseSingleValuedProperty;
/**

```
*                                @j2c.javaBean
    class="com.ibm.connector2.cics.ECIManaged
    ConnectionFactory"
*/
public class MCFPropertyGroup_CICSECI extends
    BasePropertyGroup {
  public   MCFPropertyGroup_CICSECI(  )   throws
    Exception{super(/* Name, Display Name, Descrip-
    tion           */"ECIManagedConnectionFactory-
    CustomProperties",   "CICS   ECIManagedConnec-
    tionFactory       Configuration       Properties",
    "Configuration Properties for CICS ECIManaged-
    ConnectionFactory");
    BaseSingleValuedProperty   connectionClass=new
      BaseSingleValuedProperty   ("connectionClass-
      Name", "Connection class name", "Name of the
      Managed   Connection   Factory   class",   java-
      .lang.String.class, this);
    connectionClass.setEnabled(true);
    connectionClass.setRequired(true);
    connectionClass.setExpert(false);
    connectionClass.setReadOnly(true);
    String                         validClassNames[
      ]={"com.ibm.connector2.cics.ECIManaged
      ConnectionFactory"};
    connectionClass.setValidValues(validClassNames);
    addProperty(connectionClass);
    this.addCustomProperties( );}
  /**
  *@j2c.javaBean-property    name="connectionURL"
    propertyMapping="ServerSettings:Connection-
    URL"
  *@j2c.javaBean-property         name="serverName"
    propertyMapping="ServerSettings:ServerName"
  *@j2c.javaBean-property         name="portNumber"
    propertyMapping="ServerSettings:PortNumber"
  *@j2c.javaBean-property           name="userName"
    propertyMapping="UserVerification:UserName"
  *@j2c.javaBean-property            name="password"
    propertyMapping="UserVerification:Password"
  */
  public void addCustomProperties( ) throws Exception
    {BasePropertyGroup serverSettings=new BaseProper-
    tyGroup ("ServerSettings", "Server Settings", "Server
    configuration properties")
    {public IPropertyDescriptor[ ] getProperties( ) {try
      {BaseSingleValuedProperty   connectionURL=new
      BaseSingleValuedProperty      ("ConnectionURL",
      "Connection URL", "Connection URL", java. lang.
      String.class, this);
      connectionURL.setEnabled(true);
      connectionURL.setRequired(true);
      connectionURL.setExpert(false);
      connectionURL.setDefaultValue ("http://local
        host)");
      BaseSingleValuedProperty serverName=new BaseS-
        ingleValuedProperty    ("ServerName",    "Server
        Name", "Name of the target server", java. lang.
        String.class, this);
      serverName.setEnabled(true);
      serverName.setRequired(false);
      serverName.setExpert(false);
      BaseSingleValuedProperty portNumber=new BaseS-
        ingleValuedProperty ("PortNumber", "Port Num-
        ber", "Number of the port to connect to", java.
        lang.String.class, this);
      portNumber.setEnabled(true);
      portNumber.setRequired(false);
      portNumber.setExpert(false);}
      catch(Exception e) {Logger.global.log(Level.INFO,
        e.getLocalizedMessage( ));}
      return super.getProperties( );}};
    serverSettings.setEnabled(true);
    addProperty(serverSettings);
    BasePropertyGroup userVerification=new BaseProper-
      tyGroup ("UserVerification", "User Verification",
      "User Authentication data")
    {public IPropertyDescriptor[ ] getProperties( ) {try
      {BaseSingleValuedProperty userName=new BaseS-
      ingleValuedProperty ("UserName", "User Name",
      "Name of the user establishing connection", java-
      .lang.String.class, this);
      userName.setEnabled(true);
      userName.setRequired(true);
      userName.setExpert(false);
      BaseSingleValuedProperty password=new BaseSin-
        gleValuedProperty   ("Password",   "Password",
        "Password of the user establishing connection",
        java.lang.String.class, this);
      password.setEnabled(true);
      password.setRequired(true);
      password.setExpert(false);
      password.setSensitive(true);}
      catch(Exception e) {Logger.global.log(Level.INFO,
        e.getLocalizedMessage( ));}
      return super.getProperties( );}};
    userverification.setEnabled(true);
    addProperty(userVerification);
    //NOTE: Similiar grouping for "Advanced Properties"
      would go below}}
```

In this example, the Java code implements the mapping between a property in property Java object 54 and a corresponding property in Java Bean 50 using Java Bean property doclets (e.g., comments starting with "@" symbol), which are processed by a Doclet tool. To this extent, the "@j2c.javaBean class . . . " doclet identifies the Java Bean 50, while each "@j2c.javaBean-property . . . " doclet maps a property in Java Bean 50 (e.g., name="connectionURL") to a property in property Java object 54 (e.g., propertyMapping="ServerSettings:ConnectionURL"). Further, property Java object 54 defines two property groups (e.g., serverSettings and userVerification). As seen in the Java code above, as part of the definition of each property group, each property within the property group is defined and various attributes are set (e.g., display name, enabled/disabled, required/not required, expert/standard, etc.).

Frequently, the set of properties 58 will include one or more configurable properties for which user 16 (FIG. 1) can specify a value. To this extent, user interface 42 can include one or more user interface controls that enable user 16 to specify a value for one or more properties 58. Further, property Java object 54 can include user interface attributes that correspond to the values for one or more properties 58. For example, property Java object 54 can include a set of enumerated values/a value range that define a set of valid values for a property 58. In this case, interface component 36 can validate the values provided by user 16 and/or restrict the values that can be entered by user 16 (e.g., via a check box, radio buttons, drop down list, and/or the like). Additionally, property Java object 54 can include a default value for one or more properties 58. In this case, interface component 36 can determine if property 58 currently includes a value in Java Bean 50, and if not, the default value specified in property Java object 54 can be used and displayed in user interface 42. Additionally, property Java object 54 can include an indication as to whether a property 58 requires a corresponding value and/or the value is optional. Similarly, property Java object 54 can include an indication as to whether one or more properties 58 and/or property groups comprise "advanced" properties 58 and/or property groups whose values generally can be left as the default (no value or a default value) and/or not displayed to user 16.

Figure 4A:
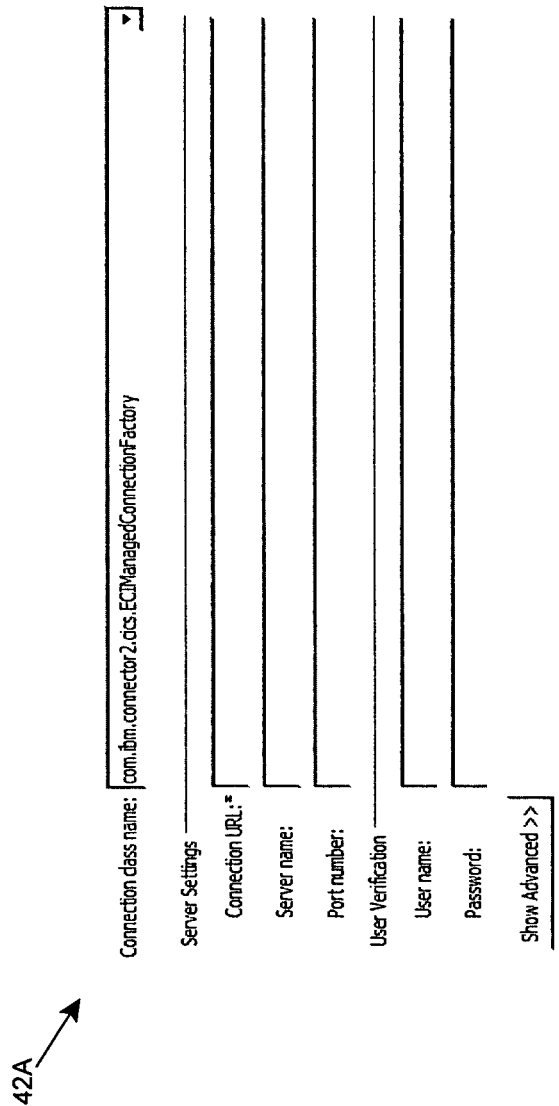
FIG. 4A shows an illustrative user interface according to an embodiment of the invention.

FIG. 4A shows an illustrative user interface 42A according to an embodiment of the invention, which can be generated using the illustrative Java code included above. Referring to FIGS. 3 and 4A, user interface 42A corresponds to the same Java Bean 50 as the prior art user interface 40 (FIG. 2). However, user interface 42A includes several features that make it more user-friendly. For example, user interface 42A uses a display name for several properties 58 rather than the property name (e.g., "Port number" rather than "PortNumber"). Further, user interface 42A displays only a subset of the set of properties 58 for Java Bean 50. Interface component 36 can select the subset based on optional/required and/or standard/advanced settings included in property Java object 54. Still further, user interface 42A displays the subset of properties 58 in two property groups, each of which has a corresponding property group name (i.e., "Server Settings" and "User Verification").

FIG. 4B shows an alternative user interface 42B that can be generated by interface component 36 after user interface 42A (FIG. 4A) has been expanded by user 16 (FIG. 1) according to an embodiment of the invention. Referring to FIGS. 3 and 4B, user 16 can select the "Show Advanced" user interface control (shown in FIG. 4A) to display additional properties 58 not displayed in user interface 42A. As shown in user interface 42B, contrary to user interface 40 (FIG. 2), the property "TraceLevel" (for which the display name "Trace level" is used in user interface 42B) includes a default value of 1 and user interface 42B limits the values that can be selected by user 16 via a drop down box. It is understood that the various user interface attributes shown and described herein are only illustrative. To this extent, various additional user interface attributes can be included and defined in property Java object 54 as will be recognized by one familiar with the art.

Returning to FIG. 3, user 16 (FIG. 1) can select a set of values for properties 58 (i.e., configurable properties) using user interface 42. Subsequently, user 16 can select to save/write the values to Java Bean 50. To this extent, interface component 36 can obtain the set of values from user interface 42, and write the set of values to Java Bean 50. In order to write the set of values, interface component 36 can match the displayed property name in user interface 42 and the corresponding value with a property 58 based on property Java object 54. For example, as discussed herein, property Java object 54 can include annotation data that enables a property 58 to be matched with its corresponding display name. The updated Java Bean 50 then can be used by the J2EE CA Resource Adapter as is known in the art.

While shown and described herein as a method and system for managing a set of program objects, it is understood that the invention further provides various alternative embodiments. For example, in one embodiment, the invention provides a program product stored on a computer-readable medium, which when executed, enables a computer infrastructure to manage the set of program objects. To this extent, the computer-readable medium includes program code, such as tooling framework 30 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), on paper (e.g., capable of being scanned in as electronic data), and/or the like.

In another embodiment, the invention provides a method of generating a system for managing a set of program objects. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a method that performs the process described herein on a subscription, advertising, and/or fee basis. That is, a service provider, such as an Application Service Provider, could offer to manage a set of program objects as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a program object, the method comprising:
obtaining a set of configurable properties for the program object wherein the program object includes at least one of: a Java Bean, an applet, or a Java applet, the program object storing executable code;
obtaining a set of values corresponding to the set of configurable properties;
obtaining a property object for the program object, the property object defining a set of user interface attributes for the program object;
modifying the executable code in the program object using the set of values; and
generating a user interface based on the set of configurable properties, the set of values written to the program object and the property object.

2. The method of claim 1, the obtaining a set of configurable properties including introspecting the program object.

3. The method of claim 1, the obtaining a set of configurable properties including obtaining at least one of the set of properties from a deployment description file for the program object.

4. The method of claim 1, the obtaining a property object including obtaining linking data for the program object, the linking data identifying the property object.

5. The method of claim 4, the linking data comprising a linking entry in a configuration table.

6. the method of claim 1, further comprising matching a displayed property name and corresponding value with a property in the program object based on the property object.

7. The method of claim 1, the generating including at least one of:
using a display name for at least one of the set of configurable properties;
assigning a default value for at least one of the set of configurable properties;
grouping a plurality of the set of configurable properties; and
displaying a subset of the set of configurable properties.

8. A system for managing a program object, the system comprising:
a processor device and memory device;
a system for obtaining a set of configurable properties for the program object wherein the program object includes at least one of:
a Java Bean, an applet, or a Java applet, the program object storing executable code;
a system for obtaining a set of values corresponding to the set of configurable properties;
a system for obtaining a property object for the program object, the property object defining a set of user interface attributes for the program object;
a system for modifying the executable code in the program object using the set of values; and
a system for generating a user interface based on the set of configurable properties, the set of values written to the program object and the property object.

9. The system of claim 8, the system for obtaining a set of configurable properties including a system for obtaining at least one of the set of properties from a deployment description file for the program object.

10. The system of claim 8, the system for obtaining a property object including a system for obtaining linking data for the program object, the linking data identifying the property object.

11. The system of claim 8, further comprising a system for matching a displayed property name and corresponding value with a property in the program object based on the property object.

12. The system of claim 8, the system for generating including at least one of:
a system for using a display name for at least one of the set of configurable properties;
a system for assigning a default value for at least one of the set of configurable properties;
a system for grouping a plurality of the set of configurable properties; and
a system for displaying a subset of the set of configurable properties.

13. A program product stored on a non-transitory computer-readable medium, which when executed, enables a computer infrastructure to manage a program object, the program product comprising computer program code for enabling the computer infrastructure to:
obtain a set of configurable properties for the program object wherein the program object includes at least one of: a Java Bean, an applet, or a Java applet, the program object storing executable code;
obtain a set of values corresponding to the set of configurable properties;
obtain a property object for the program object, the property object defining a set of user interface attributes for the program object;
modify the executable code in the program object using the set of values; and
generate a user interface based on the set of configurable properties, the set of values written to the program object and the property object.

14. The program product of claim 13, the computer program code for enabling the computer infrastructure to obtain a property object including computer program code for enabling the computer infrastructure to obtain linking data for the program object, the linking data identifying the property object.

15. The program product of claim 13, further comprising computer program code for enabling the computer infrastructure to match a displayed property name and corresponding value with a property in the program object based on the property object.

16. The program product of claim 13, the computer program code for enabling the computer infrastructure to generate including computer program code for enabling the computer infrastructure to perform at least one of:
use a display name for at least one of the set of configurable properties;
assign a default value for at least one of the set of configurable properties;
group a plurality of the set of configurable properties; and
display a subset of the set of configurable properties.

17. A method of generating a system for managing a program object, the method comprising:
providing a computer infrastructure operable to:
obtain a set of configurable properties for the program object wherein the program object includes at least one of: a Java Bean, an applet, or a Java applet, the program object storing executable code;
obtain a set of values corresponding to the set of configurable properties;
obtain a property object for the program object, the property object defining a set of user interface attributes for the program object;

modify the executable code in the program object using the set of values; and generate a user interface based on the set of configurable properties, the set of values written to the program object and the property object.

* * * * *